UNITED STATES PATENT OFFICE.

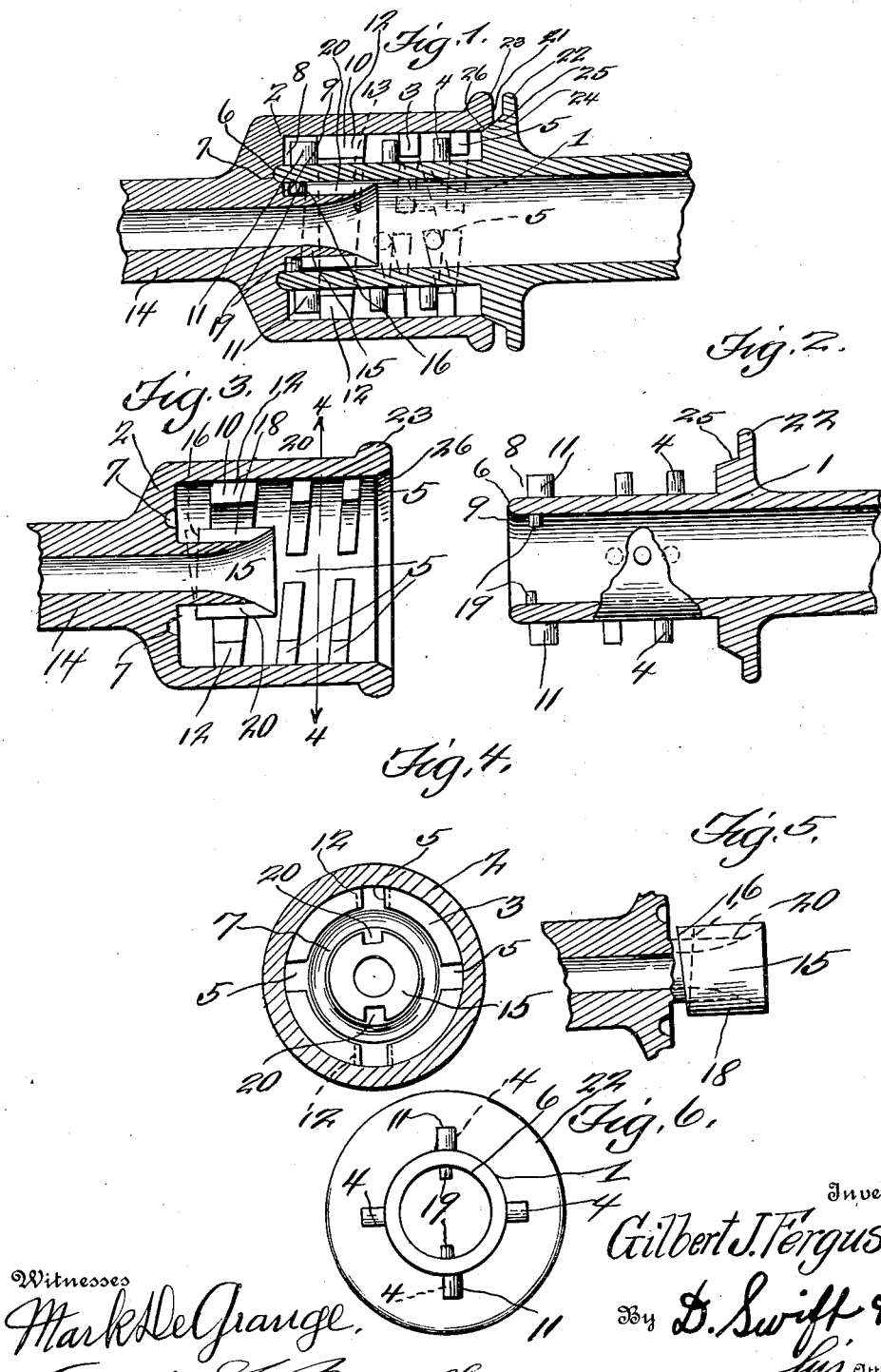
G. J. FERGUSON.
PIPE COUPLING.
APPLICATION FILED MAR. 22, 1913.
1,074,706.
Patented Oct. 7, 1913.

GILBERT JEROME FERGUSON, OF LOST CREEK, PENNSYLVANIA.

PIPE-COUPLING.

1,074,706.  Specification of Letters Patent.  Patented Oct. 7, 1913.

Application filed March 22, 1913. Serial No. 756,263.

*To all whom it may concern:*

Be it known that I, GILBERT J. FERGUSON, a citizen of the United States, residing at Lost Creek, in the county of Schuylkill and State of Pennslvania, have invented a new and useful Pipe-Coupling; and I do hereby declare the following to be a full, clear, and exact description of the invention, such as will enable others skilled in the art to which it appertains to make and use the same.

This invention relates to a new and useful pipe coupling.

It is an object of this invention to provide a coupling, which can be easily and quickly assembled or connected and disassembled and provided with a ground joint, in order to insure against leakage.

In practical fields it may be found necessary to subject the details of construction to alterations, to which the patentee is entitled, provided the alterations fall within the scope of what is claimed.

The invention comprises further features and combination of parts, as hereinafter set forth, shown in the drawings and claimed.

In the drawings:—Figure 1 is a sectional view through the improved coupling showing the male and female parts locked together. Fig. 2 is a sectional view through the male member of the coupling. Fig. 3 is a sectional view through the female member of the coupling. Fig. 4 is a sectional view on line 4—4 of Fig. 3. Fig. 5 is a detail view of a portion of the female member.

Referring more particularly to the drawings, 1 and 2 designate the male and female members of the coupling, which are telescopically insertible, in order to produce a proper union. Upon the interior circumference of the female member an interrupted worm 3 is provided. While upon the outer circumference of the male member a series of radially projecting lugs 4 are provided, which are arranged spirally, and when the male and female members are telescopically joined, the lugs 4 pass through the openings 5 of the worm, and then by a slight revoluble movement the lugs 4 will lock behind the worm, thereby forcing the rounded extremity 6 of the male member into the annular recess 7 of the female member, thereby insuring a ground joint between the curved extremity and the annular recess 7.

It will be noted that upon Figs. 1 and 2 there is sufficient space or room or clearance at 8 and 9, to compensate for the wear in the annular recess 7 of the female member. In other words as the male and female members are connected, and owing to the fact that the worm and the lugs are arranged spirally, the extremity 6 of the male member will wear upon or grind out the recess 7, therefore, to compensate for this wear, the spaces or clearance 8 and 9 are provided. Also upon the interior circumference of the female member an annular interrupted flange 10 is formed, behind which the radial lugs 11 engage, that is, after passing through the openings 12 of the annular interrupted flange, in order to further lock the coupling. One side of the annular flange 10 corresponds in its inclination with the inclination of the worm 3, as shown at 13.

Extending axially with the pipe 14 of the female member, and upon the interior of such member is an extension 15 having an annular interrupted shoulder 16. This shoulder is formed owing to the provision of the annular flange 18, and when the male and female members are being inserted, one into the other, the lugs 19 on the interior of the male member enter the grooves 20 of the annular flange 18, in order to engage the shoulder 16. This shoulder 16 is partly spiral, therefore, the farther you turn the male member in the female member, the tighter the union is made between such members. In this manner a double lock is provided between the male and female members, which will insure a secure ground joint at 6 and 7 which will prevent leakage.

A clearance or space 21 is formed between the annular flanges 22 and 23 of the male and female members, which constitutes means to compensate for the ground joint 24 between the beveled portion 25 and 26 of the male and female members.

The invention having been set forth, what is claimed as new and useful is:—

In a pipe coupling, a male and female member telescopically insertible, one within the other, the female member having upon its interior an interrupted worm having diametrically opposite openings, while the male member is provided upon its exterior circumference with a plurality of spirally arranged radial lugs to enter the openings to lock into coöperation with the worm, a ground joint between one end of he male member and the interior of the female member, and a ground joint between the forward end of the female member and the rear portion of the male member, said female member having an interior extension provided with a flange forming a spiral shoulder, said flange having grooves, while the interior of the male member is provided with lugs adapted to enter the said groove to engage the said spiral shoulder, thereby forming an additional lock.

In testimony whereof I have signed my name to this specification in the presence of two subscribing witnesses.

GILBERT JEROME FERGUSON.

Witnesses:
  THOMAS CANTLIN,
  FRANK HANNA.